Oct. 22, 1963  F. R. QUINN  3,107,894
SNAP ACTING FLOW CONTROL VALVE WITH VENTURI FORMED
BETWEEN THE ORIFICE AND CONICAL VALVE PLUG
Filed Oct. 17, 1962

INVENTOR.
Frederic R. Quinn
BY
Irving Seidman
ATTORNEY

United States Patent Office 3,107,894
Patented Oct. 22, 1963

3,107,894
SNAP ACTING FLOW CONTROL VALVE WITH VENTURI FORMED BETWEEN THE ORIFICE AND CONICAL VALVE PLUG
Frederic R. Quinn, Red Hook, N.Y., assignor to Zyrotron Industries, Inc., Red Hook, N.Y., a corporation
Filed Oct. 17, 1962, Ser. No. 231,097
3 Claims. (Cl. 251—118)

This invention relates in general to a valve construction, and more specifically to an on-off valve constructed and arranged with an inherent mechanical advantage so as to facilitate its operation with extremely low power requirements.

An object of this invention is to provide an on-off valve having a minimum of component parts offering a full opening and positive shut-off action.

Another object is to provide a valve construction in which the fluid chamber of the valve is sealed fluid-tight from the valve actuating means.

Still another object is to provide a valve construction which is free of gravitational effects and which is constructed so that the fluid pressure operating thereon results in a mechanical advantage which renders the same operable between fully opened and fully closed positions with a minimum amount of force.

Still another object is to provide a valve construction having a long, trouble-free operating life.

The foregoing objects, and other features and advantages, are attained in accordance with this invention by a valve body having a fluid inlet chamber and a fluid outlet chamber separated by a partition having an orifice or fluid opening therein. In accordance with this invention the opening is valved by a resilient valve member having a plug end portion adapted to seat on the orifice in the closed position thereof, and a resilient diaphragm connected to the other end thereof for sealing the fluid chamber of the valve body. A valve cap or nut secures the diaphragm to the valve body and a valve actuating means is operatively connected to the exterior end of the valving member so as to be disposed entirely exteriorly of the fluid chamber. The plug end and diaphragm portions of the valving member are proportioned so that the fluid pressure acting on the diaphragm will have a force greater than the force of the fluid pressure acting on the plug end. Thus the force applied to the actuating rod to maintain the valving member in its closed position is required to be only slightly greater than the difference between the respective forces acting on the valving member and produced by the fluid pressure within the valve body. In accordance with this invention the orifice and the plug end of the valve member are respectively proportioned so as to define in the open position of the valve a fluid passageway shaped to utilize a venturi effect so that the velocity of the fluid therethrough is greatest at the orifice inlet. As a result the pressure at the orifice outlet is greater than that at its inlet and this difference in pressure is utilized to produce an upward force for aiding in speeding the opening of the valve.

A feature of this invention resides in the provision of a relatively simple valve construction which is inexpensive to produce and which is positive in operation.

Another feature resides in the provision of a valving member constructed for effecting a valving action of the valve and which includes a diaphragm for effecting a fluid-tight seal of the fluid chamber of the valve.

Another feature resides in the provision wherein the flexible diaphragm is shaped so as to produce a trigger-type spring action which effectively reduces the actuating force requirements and accelerates the valve action.

Another feature resides in the provision in which the valve actuator is disposed entirely exteriorly of the fluid chamber of the valve.

Other features and advantages will be rendered more readily apparent when considered in view of the drawing and description in which.

Figure 1:
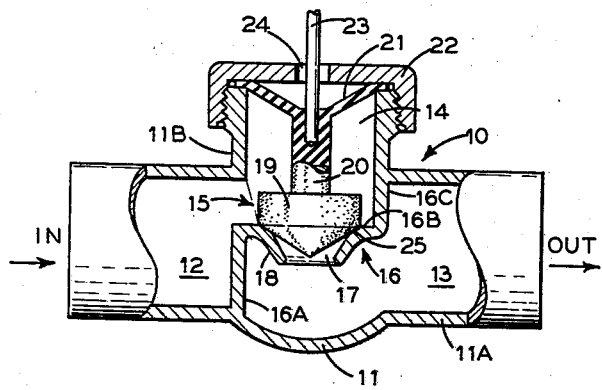
FIG. 1 is a side elevation view of the valve construction of this invention shown partly in section and in the closed position thereof.

Referring to the drawings, there is shown in FIG. 1 the valve structure 10 of the instant invention. It comprises essentially a T-shaped valve body 11 formed of suitable rigid material, e.g. a metal or plastic material. The cross-head portion 11A of the valve body 11 defines an inlet fluid chamber portion 12 and an outlet fluid chamber portion 13, the respective ends of which are connected to a suitable conduit not shown. The stem portion 11B of the valve body 11 is disposed in communication with the inlet fluid chamber portion 12 of the valve body 11 and defines the fluid chamber 14 in which the valve member 15 is reciprocally mounted.

A partition member 16 separates the inlet chamber 12 from the outlet chamber 13. As shown, the partition 16 comprises a lower upright portion 16A, a lateral offset portion 16B and an upper upright portion 16C. Formed in the offset portion 16B is an opening, passageway or orifice 17 for connecting the inlet chamber 12 to the outlet chamber 13. The orifice 17 is defined by a frusto-conically shaped wall portion 18 having a convex surface on the inlet side thereof and which converges toward the fluid outlet chamber 13.

Figure 2:
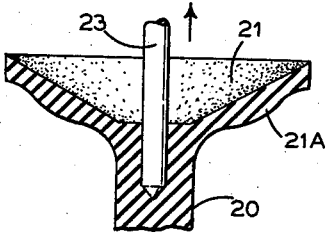
FIG. 2 is an enlarged fragmentary detail of the diaphragm member.
Figure 4:
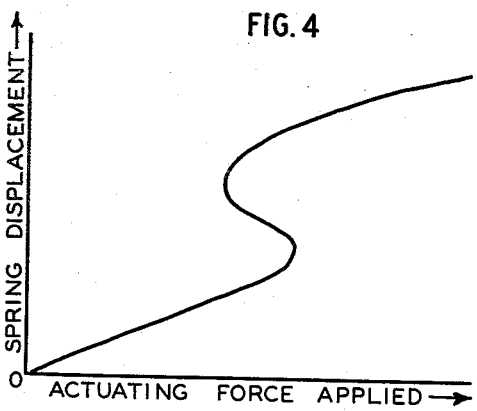
FIG. 4 is a graphic illustration of a typical spring action curve of displacement versus applied force of the diaphragm portion of the valving member.

In accordance with this invention a novel valving member 15 is provided for valving the opening 17. As shown, the valving member 15 is preferably formed of a resilient material, e.g. rubber, neoprene and the like. It comprises a conical shaped plug end portion 19, a valve stem 20 connected thereto, and a diaphragm or spring disk 21 connected to the upper end of the valve stem 20. As shown in FIG. 2, the intermediate portion 21A of the diaphragm disk is thickened to define in cross section relatively thickened and reduced cross sectional areas to give to the diaphragm displacement versus applied force a curve of the kind indicated in FIG. 4. The "force-displacement" characteristic of the specifically shaped diaphragm 21 is not only non-linear, but also has a "back bend" as clearly shown in FIG. 4. This "back bend" indicates a snap action imparted to the vlave which is normally biased in the closed position of the valve. Accordingly, it will be noted that the snap action is accomplished without the diaphragm being flipped to the upper side of the top edge of the fluid chamber 14, as the diaphragm will normally flex or snap about the ring of reduced cross sectional area which is disposed adjacent to the stem 20 as viewed in FIG. 2. With the shape or configuration of the diaphragm disk 21 illustrated, a trigger type spring or snap action is imparted to the valve member 15 when the peripheral portion of the diaphragm is clamped onto the valve stem 11B by a valve nut or cap 22 threaded to the valve body. With the diaphragm disk 21 clamped in the manner shown in FIG. 1, it will be noted that the fluid chamber 14 of the valve is rendered fluid-tight.

In accordance with this invention a valve actuator 23 is connected to the exterior end of the valve member 15, the actuator 23 extending upwardly through a hole 24 in the cap 22. It will be understood that the valve actuator 23 may be operated by any suitable valve operator, e.g. a solenoid, an air bellows, bi-metallic strip, and the like (not shown).

The operation of the valve is as follows:

It will be apparent that when the actuator rod 23 is forced downward, as viewed in FIG. 1, by a suitable valve operator (not shown) the conical plug 19 of the valve member 15 is pressed closed against the rim or valve seat 25 circumscribing the orifice 17 to shut off the flow of fluid through the valve body 11. Consequently the fluid pressure in chamber 14 acting on the plug end 19 forces it into a tight seal with the valve seat 25. Simultaneously the fluid in chamber 14 also exerts a force on the diaphragm disk 21. According to this invention, the diaphragm disk 21 and the valve plug 19 are proportioned so that the forces acting on the diaphragm 21 are greater than that acting on the plug 19. For this reason the force applied to the actuating rod 23 necessary to keep the valve member 15 in the closed position need only be slightly greater than the difference between the respective forces produced by the fluid pressure on the diaphragm 21 and plug 19.

Figure 3:
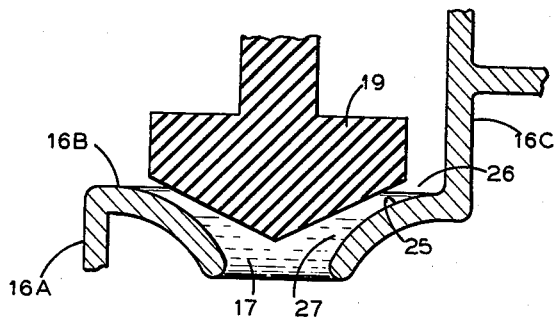
FIG. 3 is an enlarged sectional detail of the orifice and valve plug shown in the open position thereof.

To open the valve, the actuator 23 is caused to move upwardly, as viewed in FIG. 1. The upward movement of the plug end 19 causes the seal with the valve seat 25 to be broken. As best seen in FIG. 3, the shape of the plug end 19 and the orifice 17 is such that when the valve is opened the cross-sectional area 26 at the inlet to the fluid passageway is smaller than the cross-sectional area 27 at the outlet end of the fluid passageway, with a graduated variation in between. As a result a Venturi effect is had, i.e. the fluid velocity through the orifice inlet is greater than at the orifice outlet thereof. Thus the pressure in the area 27 is increased i.e. the Venturi effect causes the downward force produced on the upper face on the plug end 19 to be offset by the upper force produced on the lower face of the plug 19. This pressure differential tends to assist in the rapid opening of the fluid passageway or orifice 17. Once the valve is fully opened, the upward forces acting on the diaphragm 21 and the plug end 19, as produced by the fluid pressure in chamber 14 and space 27, tend to keep the valve member 15 in the open position. For this reason, only a very small upward force is required to be applied to the actuating rod 23 to keep the valve open. Without the Venturi effect however, the area 27 may assume the pressure of the outlet, to result in a much lower upward force applied to the lower face of the plug 19. In the absence of the Venturi orifice, a much slower acting valve results and/or more power would be required to operate the same.

In a typical illustrative example, a valve opening of 1.6 in.² for a fluid pressure of 50 p.s.i. is effectively controlled with an actuating rod of ⅛″, and a force required to move the rod of approximately 2 to 5 oz.

From the foregoing it will be apparent that the resilient spring disk or diaphragm 21 when clamped between the cap 22 and valve body 11 provides an effective leak-proof seal between chamber 14 and the atmosphere. Also the diaphragm is shaped to produce a trigger-type spring or snap action which effectively reduces the actuating force requirements and accelerates the valve action. Accordingly, the valve can function essentially as an on-off control for fluid flow in sinks, dishwashers, toilets, and the like. The valve having a minimum number of parts is rendered useful for a long and trouble-free life, and due to the small amount of force required to operate the same, it can be controlled mechanically by a relatively small float. Electrically it may be operated by a solenoid, and for this reason can be used in heating or cooling systems which lends it to automation. Thermally the valve can be controlled by bimetal actuators or by expansion of a gas or liquid, and thus can be applied for use in refrigeration, air conditioning, oil fields and the like. The valve structure is free of gravitational effects and employs a fluid passage Venturi effect which will not restrict flow.

While the instant invention has been disclosed with reference to a particular embodiment thereof, it is to be appreciated that the invention is not to be taken as limited to all of the details thereof as modifications and variations thereof may be made without departing from the spirit or scope of the invention.

What is claimed is:

1. An on-off valve for controlling the flow of fluid therethrough comprising
   (a) a T-shaped valve body including a stem portion and a cross-head portion,
   (b) said cross-head portion defining a fluid inlet chamber at one end and a fluid outlet chamber at the other end thereof,
   (c) a partition separating said fluid inlet chamber from said fluid outlet chamber,
   (d) said partition having a tapering wall portion forming a conically shaped passageway converging toward said fluid outlet chamber defining an orifice for connecting said inlet chamber in communication with said outlet chamber, said wall portion having a substantially convexly curved shape from the inlet to the outlet sides thereof,
   (e) said passageway having an inlet and outlet, said inlet being greater in cross-sectional area than said outlet, and said outlet opening to said fluid outlet chamber,
   (f) said stem defining a valving chamber open to said inlet fluid chamber,
   (g) a valving member reciprocally mounted in said stem for valving the inlet of said orifice,
   (h) said valving member including a plug end adapted to seat on said inlet to said orifice in the closed position of said valve to define a line seal thereat, said plug end being conical in shape and having its apex converging in the same direction as the wall of said passageway and said plug end and orifice being so constructed and arranged that in the open position of said orifice the surfaces of said plug end and the walls of said passageway define a venturi,
   (i) a valve stem connected to said plug, and
   (j) resilient diaphragm means connected to the upper end of said valve stem,
   (k) said diaphragm means being provided with a reduced cross sectional area about which said diaphragm means is free to flex with a non-linear back hand force versus displacement characteristic to provide a quick snapping action and said diaphragm means being adapted to seat on the peripheral edge of said stem to form a seal for said valving chamber, and the area of the diaphragm means exposed to the pressure of the fluid being greater than that of the plug,
   (l) a closure cap clamping said diaphragm means in place to effect a fluid-tight seal for said valve body, said closure cap having an opening therein,
   (m) and a valve actuator connected to said valving member for actuating the same between open and closed position,
   (n) said actuator projecting outwardly through said opening in said cap.

2. A valve construction comprising,
   (a) a valve body,
   (b) said body including an inlet portion and an outlet portion,
   (c) means defining an opening for communicating said inlet portion with said outlet portion, said means including tapering wall portions which converge towards the outlet portion, and said tapering wall portions having a substantially convexly curved shape from the inlet to the outlet sides thereof, to define an orifice,
   (d) said valve body including means defining a valve chamber on the inlet side of said orifice.

(e) a valving member reciprocally mounted in said valve chamber for valving said orifice, said valving member including a conically shaped plug end adapted to seat on said orifice, said plug end having an apex converging in the same direction as the tapering wall portions defining said opening, and said plug end and orifice being so constructed and arranged that in the open position of said orifice the surfaces of said plug end and the wall portions define a venturi, (f) resilient diaphragm means formed integral with said valving member, said diaphragm means having annular portions of relatively thickened and reduced cross-sectional areas to effect a force versus displacement characteristic having a back bend feature to impart a quick snapping action to the valving member connected thereto when actuated, (g) closure means clamping the periphery of said diaphragm means to said valve chamber and thereby effectively sealing said valve chamber fluid tight and, (h) a valve actuator operatively connected to said valve member to reciprocally displace said valving member and said diaphragm whereby the latter in cooperation with the reaction of Venturi effect caused by the flow of fluid through the orifice and acting on the valve member upon initial displacement thereof function to minimize the actuating force necessary for operating said valve member.

3. A valve comprising,
(a) a valve body defining an inlet chamber, and an outlet chamber,
(b) wall means defining an orifice having a substantially convexly curved shape from the inlet to the outlet sides thereof disposed in said body for partitioning said inlet chamber from said outlet chamber, and said orifice connecting said chambers in communication with one another with said orifice converging toward said outlet chamber and the diverging end thereof defining a valve seat, (c) means for valving said orifice,
(d) said valving means including a conically shaped end plug adapted to seat on said valve seat,
(e) said plug having its apex converging in the same direction as said orifice and concentrically disposed therewith, said conically shaped end plug and said convex surface of said orifice being so constructed and arranged that in the open position of said orifice said convex surface of said orifice and said conically shaped plug define therebetween an annular Venturi passage wherein the pressure of the fluid at the inlet thereto is less than the pressure of the fluid at the outlet thereof,
(f) and a diaphragm means formed integral with said valving member for rendering said valve body fluid tight, said diaphragm being substantially conical and converging toward the valve seat, and said diaphragm having an annular portion of reduced area in cross section thereof to effect a force versus displacement characteristic with a back bend feature which imparts a snap action to the valving member connected thereto when actuated.

References Cited in the file of this patent

UNITED STATES PATENTS

| 650,179 | Knok | May 22, 1900 |
| 1,853,156 | Sobon | Apr. 12, 1932 |
| 2,654,559 | Franck | Oct. 6, 1953 |
| 2,684,829 | McFarland | July 27, 1954 |
| 3,034,761 | Janquart | May 15, 1962 |

FOREIGN PATENTS

| 455,723 | Italy | Mar. 13, 1950 |

OTHER REFERENCES

New Zealand; Patent Office Journal; vol. 49; page 617; Patent No. 123,942; published Dec. 19, 1960. A copy of this publication is found in the Scientific Library.